Feb. 17, 1953 — C. W. KLOFANDA — 2,628,517
STRETCHER FOR SPECTACLE FRAMES
Filed April 17, 1948
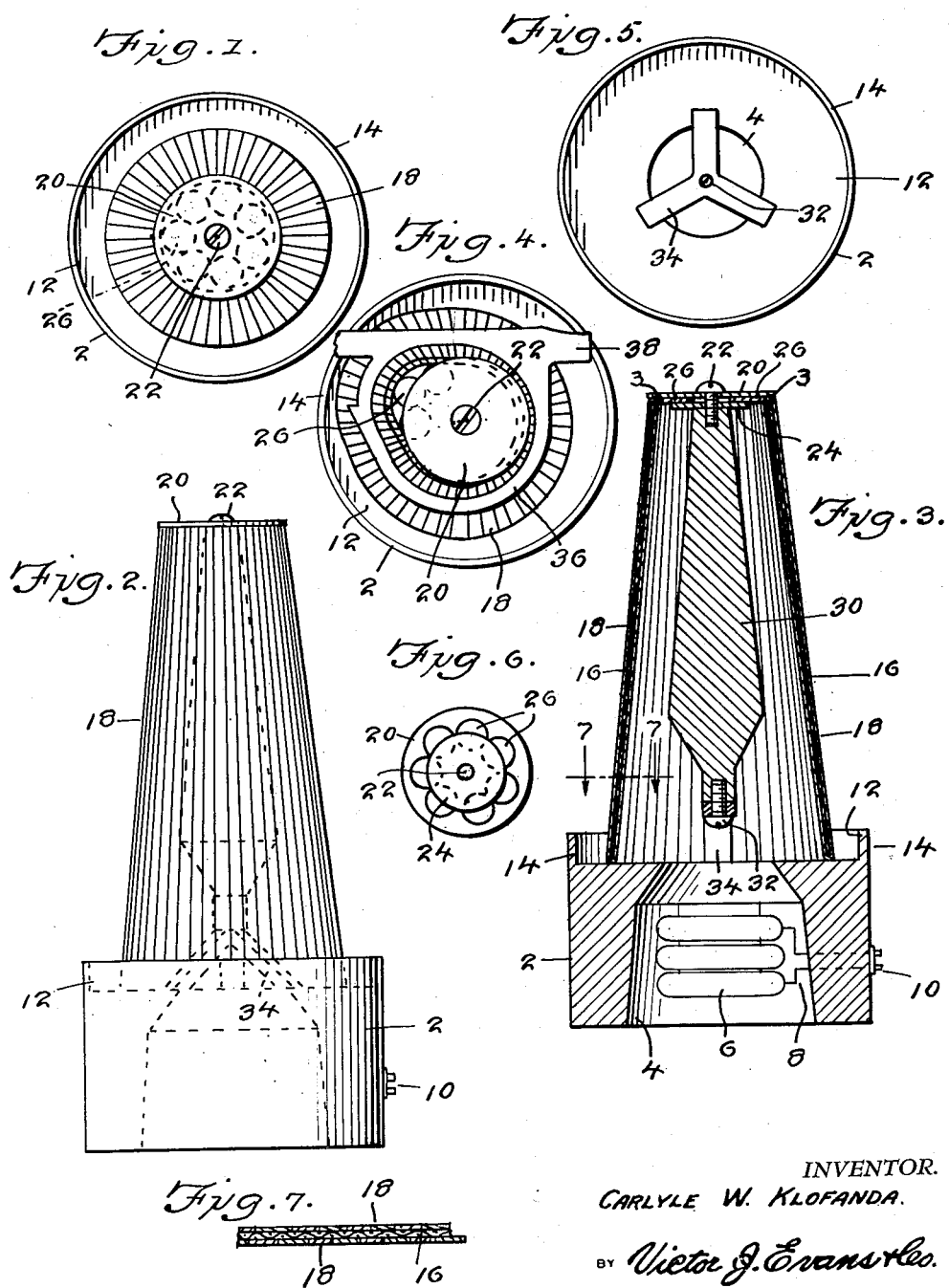
INVENTOR.
CARLYLE W. KLOFANDA.
BY Victor J. Evans & Co.
ATTORNEYS Patented Feb. 17, 1953

2,628,517

UNITED STATES PATENT OFFICE 2,628,517

STRETCHER FOR SPECTACLE FRAMES

Carlyle W. Klofanda, Fennimore, Wis.

Application April 17, 1948, Serial No. 21,590

1 Claim. (Cl. 81—3.5)

My present invention relates to an improved stretcher for spectacle frames, and more particularly to a flexible cone device upon which the closed lens receiving frame portion may be pressed so that heat from an electrical source in the cone base may be employed to heat and stretch the frame as may be necessary for the proper fitting of odd-shaped lenses.

It is common in the spectacle fitting trade to use lenses of various shapes and it is difficult to stretch or form a heated frame on a rigid cone, circular in cross section, as the cone does not assume the interior shape of the frame. Therefore I propose a flexible cone which will adapt itself to the shape of the lens frame and while maintaining the shape of the frame, by the inner heat permitting the frame to be stretched so that the lens may be inserted.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a top plan view of the stretcher of my invention ready for use.

Fig. 2 is a side elevational view thereof.

Fig. 3 is a vertical sectional view.

Fig. 4 is a top plan view of the stretcher with a lens frame thereon.

Fig. 5 is a bottom plan view of the cone.

Fig. 6 is a view showing the flexible disk assembly.

Fig. 7 is a detail view taken on line 7—7 of Figure 3 showing a section through the wall of the cone.

Referring now to the drawings wherein I have illustrated the present preferred embodiment of my invention I have shown a base 2 having a central bore 4 for the heating elements 6 connected by wires 8 to connectors 10.

A circular recess 12 is formed in the upper surface of the base creating a peripheral ring 14.

The cone is yieldable or flexible and readily conforms to the odd shapes of the lens openings of the spectacle frames when the frames are pressed downward over the upper end thereof. The cone is formed of freely flexible wire mesh 16 and the mesh is covered by strips 18 of thin flexible metal which provide a flexible wall or cone. The strips 18 extend from end to end continuously along the cone and are bent inwardly at the top to define a flange portion, 3.

The upper end of the cone is provided with a plate 20, the area of which is less than that of the lens opening of the smallest pair of spectacles, and the plate 20 is held in place by a screw 22. Between the plate 20 and a washer 24 is a plurality of freely mounted discs 26 which are free to extend outward of the plate 20 at the sides, as shown in Figure 4, and they may be slid outwardly at different points to correspond with the desired shape of a lens opening. The small discs 26 are freely slidable between the plate 20 and the washer 24 and these discs are held in position by the flange 3 of the flexible cone, the plate 20 and washer 24. The discs 26 are arranged in accordance with a certain desired configuration of a template which has the same shape as the finished spectacle rim and are then locked in this position between the plate 20 and washer 24. In use, the screw 22 can be loosened to permit the discs 26 to be properly positioned to conform to the shape of the frame, and then the screw 22 can again be tightened to clamp the discs 26 in place between the plate 20 and the washer 24.

The screw 22 is threaded into a central support and heat deflector 30 which is secured, at the lower end, by a screw 32 to a spider having legs 34 providing a support resting upon the base 2.

As illustrated in Figure 4, a lens frame 36 of a pair of spectacles 38 may be pressed downward over the upper end of the cone and the wall of the cone will conform to the shape of the lens opening which is the outer contour of the clamp discs, and when heat is supplied through the element 6 it will be transmitted by the cone to the inner edge of the spectacle frame whereby the frame becomes plastic and may be stretched so that a lens may be inserted.

It will be understood that modifications may be made in the design and arrangement of the parts without departing from the spirit of the invention.

Having thus fully described my invention what I claim as new and desire to secure by Letters Patent is:

In a stretcher for spectacle frames, a base provided with a central bore, heating elements arranged in said bore, said base having a recess formed in its upper surface, a flexible frusto-conical shaped apron having its lower end seated in said recess, said apron including a wire mesh member and a plurality of vertically disposed elongated strips extended over the outer surface of said wire mesh member, the upper ends of said strips extending inwardly to define a flange portion, a support member extending upwardly from said base, a washer mounted on the upper end of said support member, a plate arranged in spaced parallel relation above said washer, a securing element extending through said plate and washer and into said support member, and a plurality of discs interposed between said plate and washer and surrounded by said flange portion.

CARLYLE W. KLOFANDA.

REFERENCES CITED

The following references are of record in the file of this patent:

UNITED STATES PATENTS

| Number | Name | Date |
|---|---|---|
| 491,853 | Noe | Feb. 14, 1893 |
| 1,017,009 | McKinless | Feb. 13, 1912 |
| 1,674,575 | Stead | June 19, 1928 |
| 1,734,411 | Welsh | Nov. 5, 1929 |
| 2,552,043 | Horvath | May 8, 1951 |